(12) United States Patent
Ashoori et al.

(10) Patent No.: US 10,713,303 B2
(45) Date of Patent: Jul. 14, 2020

(54) DUAL INTERACTIVE VISUALIZATION SYSTEM FOR SENSITIVITY ANALYSIS TO RISK PREFERENCES FOR DECISION SUPPORT

(71) Applicant: International Business Machines Corporation, Armonk, NY (US)

(72) Inventors: Maryam Ashoori, White Plains, NY (US); Debarun Bhattacharjya, New York, NY (US); Jeffrey O. Kephart, Cortlandt Manor, NY (US); Dharmashankar Subramanian, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 854 days.

(21) Appl. No.: 14/991,117

(22) Filed: Jan. 8, 2016

(65) Prior Publication Data
US 2017/0199944 A1    Jul. 13, 2017

(51) Int. Cl.
*G06F 16/904*    (2019.01)

(52) U.S. Cl.
CPC .................. *G06F 16/904* (2019.01)

(58) Field of Classification Search
CPC ............ G06F 17/30994; G06F 16/904; G06Q 10/0635
See application file for complete search history.

(56) References Cited

U.S. PATENT DOCUMENTS

| | | | |
|---|---|---|---|
| 5,918,217 A * | 6/1999 | Maggioncalda ... | G06Q 30/0601 705/36 R |
| 7,050,998 B1 * | 5/2006 | Kale ...................... | G06Q 40/00 705/35 |

(Continued)

FOREIGN PATENT DOCUMENTS

| | | |
|---|---|---|
| EP | 1570400 | 9/2005 |
| GB | 2398899 | 9/2004 |
| WO | 2004034232 | 4/2004 |

OTHER PUBLICATIONS

Bhattacharjya, D., et al., "Three New Sensitivity Analysis Methods for Influence Diagrams", Proceedings of the 26th Conference on Uncertainty in Artificial Intelligence, Jul. 8-11, 2010, pp. 1-9.

(Continued)

*Primary Examiner* — Andre D Boyce
(74) *Attorney, Agent, or Firm* — Fleit Intellectual Property Law; Jon Gibbons (57) ABSTRACT

A system, computer program product, and method is described to provide a visualization tool which portrays the certain equivalent for one or more hypothetical (i.e. synthetic) or real probability distributions p(m), and optionally allows the user to manipulate that representation, resulting in associated changes to the underlying utility function u(m). In a first example, the risk preference visualization tool allows one to explore how the certain equivalent depends upon the probability distribution p(m), for a fixed utility function u(m). In a second example, the risk preference visualization tool allows one to explore how the certain (Continued)

equivalent depends upon the utility function u(m), assuming one or more fixed probability distributions $p_1(m)$, $p_2(m)$, etc. In a third example, the decision maker can provide feedback through the visualization tool that would cause their utility function to be modified.

17 Claims, 7 Drawing Sheets (56) References Cited

U.S. PATENT DOCUMENTS

| | | | | |
|---|---|---|---|---|
| 8,396,777 | B1* | 3/2013 | Fine | G06Q 30/0202 705/35 |
| 8,583,470 | B1* | 11/2013 | Fine | G06Q 40/04 705/7.31 |
| 2003/0033240 | A1* | 2/2003 | Balson | G06Q 10/10 705/37 |
| 2005/0033678 | A1* | 2/2005 | Huneault | G06Q 40/06 705/36 R |
| 2005/0049962 | A1* | 3/2005 | Porter | G06Q 40/025 705/38 |
| 2015/0112501 | A1* | 4/2015 | Rombouts | G05F 1/66 700/295 |
| 2016/0062820 | A1* | 3/2016 | Jones | G06K 9/6265 714/37 |
| 2016/0125539 | A1* | 5/2016 | Kaya | G06Q 40/06 705/36 R |

OTHER PUBLICATIONS

Farquhar, P., "State of the art-Utility Assessment Methods", Management Science, Nov. 1984, pp. 1-20, vol. 30, Issue 11.

Howard, R., "Proximal Decision Analysis", Management Science, May 1971, pp. 1-36, vol. 17, Issue 9.

Spetzler, C., "The Development of a Corporate Risk Policy for Capital Investment Decisions", IEEE Transactions on Systems Science and Cybernetics, Sep. 1968, pp. 1-22, vol. SSC-4, No. 3.

Kirkwood, C.W., "Approximating Risk Aversion in Decision Analysis Applications", Decision Analysis, Mar. 2004, pp. 1-17, vol. 1, No. 1.

Howard, R., "Decision Analysis: Practice and Promise", Jun. 1988, pp. 1-18.

Howard, R., "The Foundations of Decision Analysis Revisited", Jul. 2007, pp. 1-44.

* cited by examiner

DUAL INTERACTIVE VISUALIZATION SYSTEM FOR SENSITIVITY ANALYSIS TO RISK PREFERENCES FOR DECISION SUPPORT

BACKGROUND

The present invention relates to data visualization systems and, more particularly, relates to methods and apparatus for visualizing utility function and risk preferences.

While the formalism of decision making under uncertainty is well-established, implementing that formalism entails certain practical challenges, including the decision maker's risk preference. Several risk preference elicitation methods are known in the art. All such methods introduce biases that may distort the decision maker's true preferences.

SUMMARY

Disclosed is a novel system, computer program product, and method to provide better more intuitive understanding of risk preferences as expressed in the form of a utility function. The invention provides a visualization tool which portrays the certain equivalent for one or more hypothetical/synthetic or real probability distributions p(m), and optionally allows the user to manipulate that representation, resulting in associated changes to the underlying utility function u(m). In a first example, the risk preference visualization tool allows one to explore how the certain equivalent depends upon the probability distribution p(m), for a fixed utility function u(m). In a second example, the risk preference visualization tool allows one to explore how the certain equivalent depends upon the utility function u(m), assuming one or more fixed probability distributions $p_1(m)$, $p_2(m)$, etc. In a third example, the decision maker can provide feedback through the visualization tool that would cause their utility function to be modified.

BRIEF DESCRIPTION OF THE DRAWINGS

The accompanying figures wherein reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The inventors have discovered a novel a system and methods for communicating the utility function through novel graphical visualizations, i.e. aside from the typical sensitivity analysis approach described above. The visualization in described in this disclosure focus on displaying probability distributions and risk premiums along with the ability for interactive analysis.

The present invention overcomes a shortcoming of prior systems which provide graphical displays of a utility function u(m) that are not sufficiently informative or meaningful. Stated differently, they are too abstract for most people to grasp intuitively, even if they are mathematically inclined.

Non-Limiting Definitions

The terms "a", "an" and "the" are intended to include the plural forms as well, unless the context clearly indicates otherwise.

The terms "comprises" and/or "comprising", when used in this specification, specify the presence of stated features, steps, operations, elements, and/or components, but do not preclude the presence or addition of one or more other features, integers, steps, operations, elements, components, and/or groups thereof.

The term "certain equivalent" a related concept to utility function is the guaranteed amount of outcome, such as money, happiness, or any other quantifiable risk-free value that an individual would view as equally desirable as a higher risky value. For example in market outcomes, a risk premium is the actual excess of the expected return on a risky asset over the known return on the risk-free asset. In another example for happiness outcomes, a risk premium is the actual excess of the expected return on a risky choice over the known return on the risk-free choice.

The term "characteristics of visualization" or "attributes of visualization" means a type of chart or type of graph such as a bar chart, histogram, scatterplot, network, or a different subset of a dataset, the number of axes or number dimensions, the units of measure or metrics. The "characteristics of visualization" may include viewing property as further described below.

The term "utility function" is a mathematical function that ranks alternatives according to their utility to an individual. The utility may be a monetary utility, a happiness utility, or any other quantifiable value to an individual.

Visualization System

Figure 1:
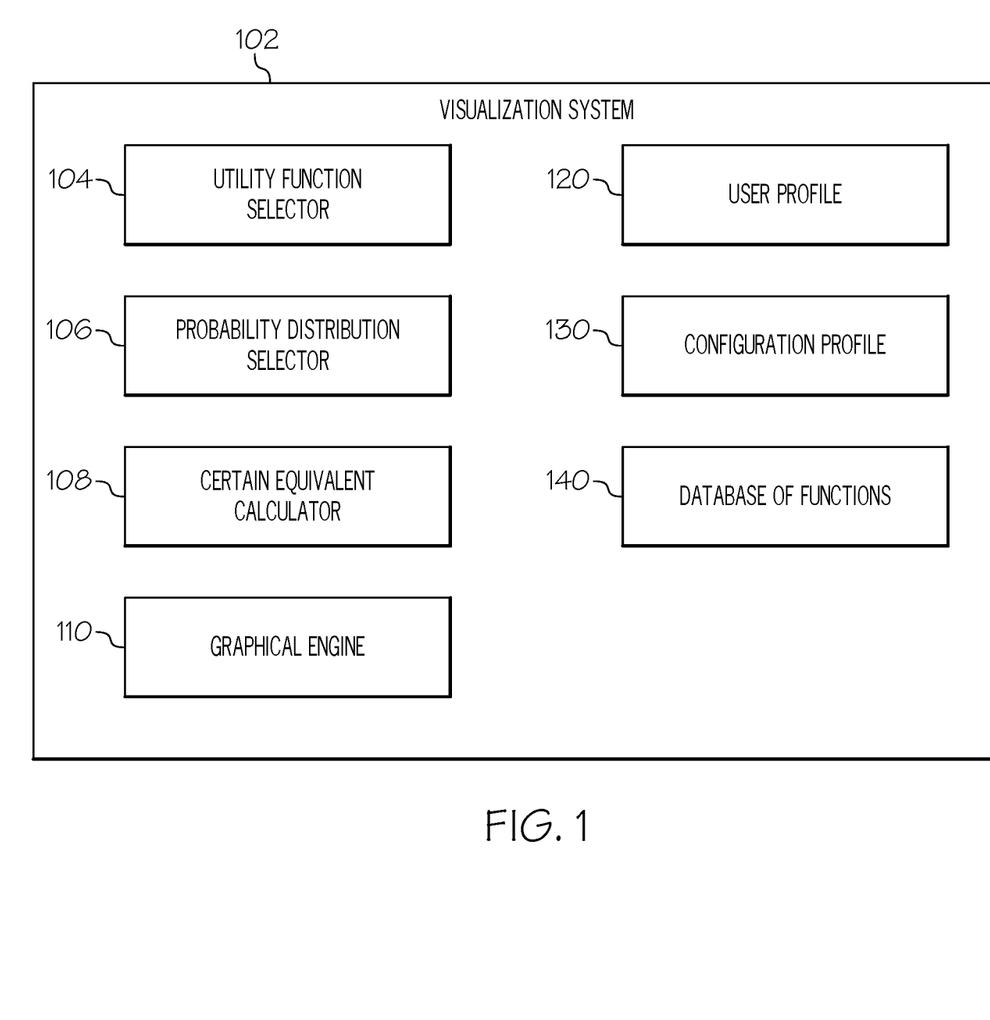
FIG. 1 is a block diagram of major components of the visualization system.

FIG. 1 is a block diagram of major components of the visualization system 102. Each of these components can be implemented in hardware, software or a combination of both. A utility function selector 104 is a module that enables a user to select a utility function from the database of stored functions 140. Examples of utility functions include Isoelastic utility, Exponential utility, Quasilinear utility, Homothetic preferences, Uzawa utility function, StoneGeary utility function, Gorman polar form Greenwood-Hercowitz-Huffman preferences, King-Plosser-Rebelo preferences, Hyperbolic absolute risk aversion. See (https://en.wikipedia.org/wiki/Utility). A probability distribution selector 106 is also shown to allow the user to select from the database of stored functions 140. Examples of probability distributions include Gaussian, Rayleigh, and Tweedie. See for example: (https://en.wikipedia.org/wiki/Distribution). The certain equivalent calculator 108 calculates the certain equivalent based upon the utility function selected in 104 and the probability function selected 106. A graph engine 110 superimposed a plot of the certainly equivalent that has been computed along with the plot of the probability distribution function. Other major modules include a user profile 120 specific to the user, i.e. setting preferences for default functions, and parameters. The configuration profile 130 includes file locations, permissions, and other general configuration information.

Risk Preference Visualization

Consider an automated decision support system that assists decision makers in choosing among alternative options or choices whose outcomes are uncertain. An important element of such a decision support system is a characterization of the decision maker's risk preference. When the outcome is a one-dimensional monetary amount, the decision maker's risk preference may be expressed as a utility function $u(m)$, where m represents a monetary value and u represents a scalar utility. The risk preference $u(m)$ can be used to decide which of two uncertain options is preferred.

The most common non-linear utility function that is deployed in practice is the exponential utility function, for a variety of reasons pertaining to tractability. One of the main advantages of the exponential utility function is that it requires only 1 parameter—the risk tolerance. Another advantage is that it appears to often be a reasonable approximation of other utility functions. Yet another advantage is that the exponential is the only utility function other than the linear function where the wealth of the decision maker need not be incorporated into calculations.

As an example, suppose that the decision maker is deliberating between two alternatives, A and B. Alternative A entails flipping a fair coin. If the result is heads, the decision maker will receive a monetary reward of $m_1$; otherwise she will receive a monetary reward of $m_2$. Alternative B entails receiving a monetary reward of $m_0$. To determine whether the decision maker prefers alternative A or B, one should compare the expected utilities as computed from the risk preference function, according to the principles of decision theory. The expected utility of alternative A is $0.5*u(m_1)+0.5*u(m_2)$, while that of alternative B is $u(m_0)$.

The certain equivalent of an alternative is defined as the decision maker's personal indifference selling price for that alternative. For a decision maker with a linear or exponential utility function, this can be computed using the utility inverse of the expected utility of the alternative. For instance, in our example, the certain equivalent of (uncertain) alternative A is:

Certain equivalent: $CE(A)=u^{-1}(0.5*u(m_1)+0.5*u(m_2))$, where $u^{-1}$ represents the inverse of $u(m)$. The certain equivalent of alternative B is $CE(B)=u^{-1}u(m_0)=m_0$.

More generally, the utility function can be applied to any probabilistic alternative characterized by a probability distribution $p(m)$; the certain equivalent in this case is $$u^{-1}(\int_m p(m)*u(m)dm)$$

If the decision maker has a number of alternatives, the automated decision support system can compute the certain equivalent for each, and identify the most preferred alternative as the one with the highest certain equivalent; this is the certain equivalent of the decision situation. The risk premium of an alternative is defined as the difference between the certain equivalent and the expected value of an alternative. For a risk-averse versus risk-seeking decision maker, the risk premium is positive versus negative.

Unlike prior art methods of decision making under uncertainty that introduce biases that may distort the decision maker's true preferences. The present invention helps to provide the decision maker some assurance that the elicited function $u(m)$ truly represents their risk preference, through a graphical representation.

This invention describes a visualization tool that enables people to understand and (if desired) edit their risk preference. In one example, the present invention does not merely display, not the utility function itself, but a depiction of its impact on various synthetic or real probabilistic decision scenarios. In other words, the visualization tool portrays the certain equivalent for one or more hypothetical/synthetic or real probability distributions $p(m)$, and optionally allows the user to manipulate that representation, resulting in associated changes to the underlying utility function $u(m)$.

Examples of Risk Preference Visualization System

The present invention provides a visualization tool that portrays the certain equivalent for one or more hypothetical i.e. synthetic or real probability distributions $p(m)$, and optionally allows the user to manipulate that representation, resulting in associated changes to the underlying utility function $u(m)$.

Figure 2:
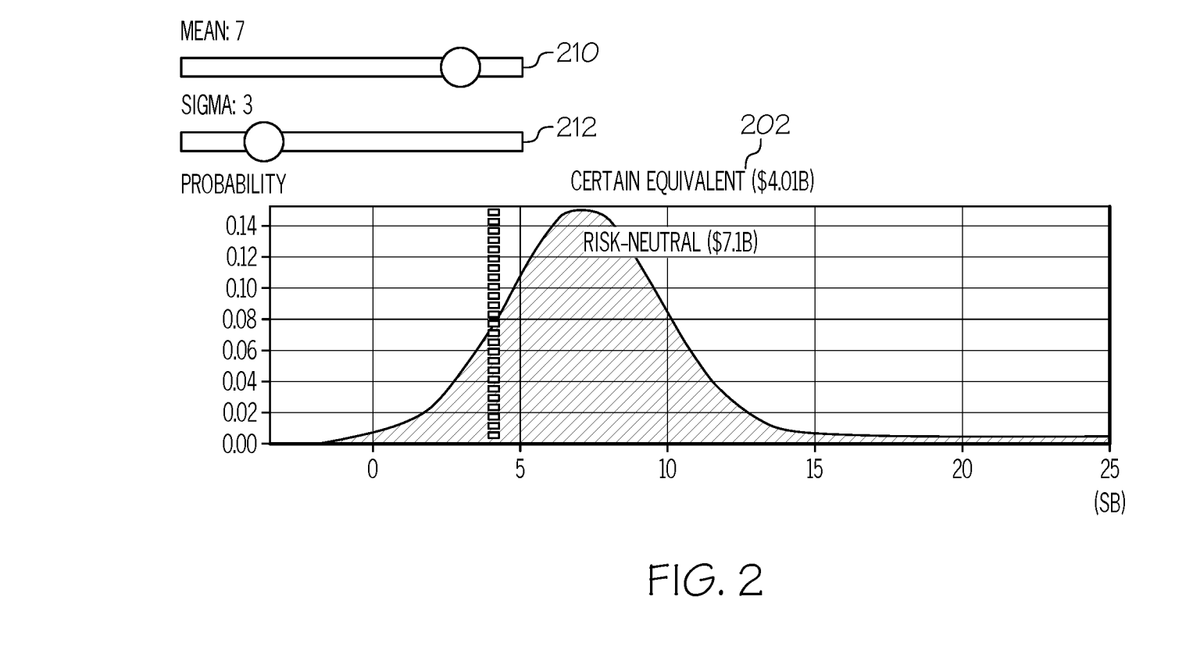
FIG. 2 is example of synthetic probability function in the form of a Gaussian with two sliders that control the mean and standard deviation.

In a first example, the risk preference visualization tool allows one to explore how the certain equivalent depends upon the probability distribution $p(m)$, for a fixed utility function $u(m)$. The tool includes sliders that control one or more parameters of a synthetic probability distribution $p(m)$. Turning to FIG. 2, shown is an example if the synthetic probability function has the form of a Gaussian, then two sliders or other selection devices are provided which control the mean and standard deviation. As the sliders are manipulated, the synthetic probability distribution is altered accordingly, the expected value and certainty-equivalent value for the associated function $p(m)$ are computed, and their positions on the X-axis are represented as vertical lines superimposed on a plot of $p(m)$. In a minor variation of the first example, the user selects from a variety of functional forms for $p(m)$, and the appropriate number and type of sliders or other selection device may be provided by the tool. In particular, the user may wish to explore bimodal or even more complex distributions that can be expressed as sums of basis functions, in which case sliders controlling the mean, standard deviation, and possibly other parameters for each basis function may be displayed and manipulated by the user.

Figure 3:
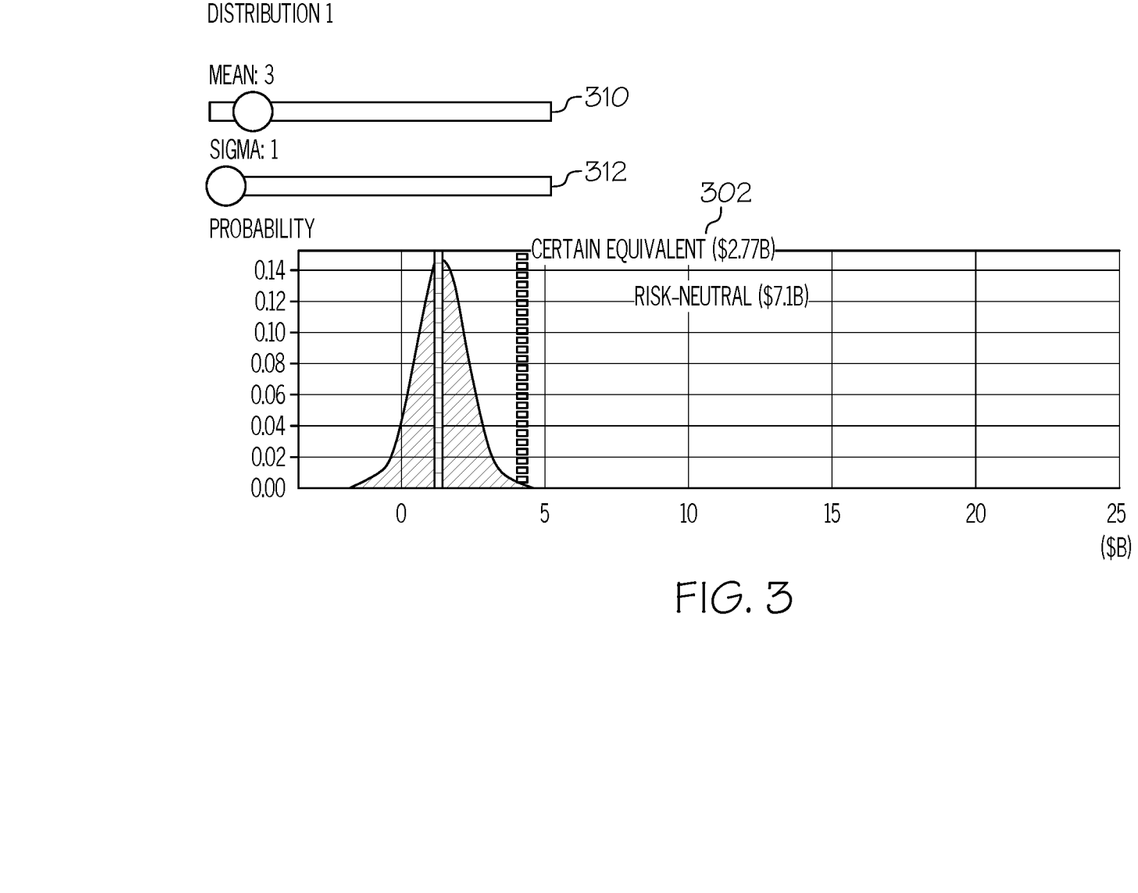
FIG. 3 is example of synthetic probability function in the form of a Gaussian with two sliders that control the mean and standard deviation where the X-axis represents the monetary value.

In FIG. 3 the visual tool interface in this first example. X-axis represents the monetary value m; Y-axis represents the probability density function $p(m)$. Sliders control mean and standard deviation of a single Gaussian, which is the assumed functional form for the probability density function in this case. As the user manipulates the sliders, p(m) changes accordingly and the certain equivalent and risk-neutral (expected-value) lines are re-computed and re-displayed dynamically.

In a second example, the risk preference visualization tool allows one to explore how the certain equivalent depends upon the utility function u(m), assuming one or more fixed probability distributions $p_1(m)$, $p_2(m)$, etc. One or more probability distributions $p_1(m)$, $p_2$ (m), etc., would be represented as a plot of probability vs. m as shown in FIG. 3. The probability distributions can be established by any means, including sliders (as in the first example). In this example, the visualization tool provides one or more sliders that control parameters that define the utility function u(m). For example, consider the one-parameter exponential utility function $$u(m)=1-e^{m/\rho}$$

where ρ (rho) is the risk tolerance coefficient. There is a single slider or other selection device that allows the decision maker to sweep dynamically through a range of ρ.

The system continually updates the expected value and certain equivalent, superimposing them on the probability functions as vertical lines placed at the appropriate values of m. In the case where there are multiple probability curves, they can be distinguished from one another by assigning to each probability curve and its corresponding certain equivalent and expected value a unique color. Optionally, one may also include a simultaneous side-by-side second visualization alongside the first visualization i.e. a dual visualization, depicting a plot of the certain equivalent value for all of the probability curves depicted in the first graph as a function of the utility function parameters. See FIG. 4. In the case of a single-parameter utility function, such as the exponential function, one can use the X-axis of the second graph as a slider that controls the value of the parameter in the first graph, allowing the decision maker to obtain additional insight about how their choice of utility function affects the certain equivalent, allowing her to assess whether this accurately reflects their risk preference.

In FIG. 3 the plot illustrating the visual interface for the second example. The X-axis represents the monetary value m; the Y-axis represents the probability density function p(m). In this case, rho is large enough so that the certain equivalent and expected value are indistinguishable; in general there will be two vertical lines for each distribution, one representing certain equivalent and one representing expected value.

The mean and standard deviation of each distribution can be adjusted by using a selection device (e.g. slider, or voice command). Similarly, a slider can allow the user to sweep through a range of values for the utility function parameter rho, thereby controlling the display represented in the figure.

In a third example, the decision maker can provide feedback through the visualization tool that would cause their utility function to be modified. Specifically, the user may use the visual tool to move the certain equivalent from the value computed and displayed (c) to a new value c'. This applies to the visual tool described in either the first or the second example, as both contain representations of the certain equivalent. This may be accomplished by allowing the user to move the vertical line indicating the certain equivalent value, or by providing a box into which the user can type a new value c', or any other means known in the art. This would be interpreted as meaning that $$u^{-1}\int_m p(m)*u(m)=c' \qquad \text{Eq. 1}$$

Since p(m) is given, this would place a constraint on the function u(m). In the special case in which u(m) can be specified by a single parameter, a single input from the user is in principle enough to determine that parameter, and hence the entire function u(m). In the very special case where u(m) has the functional form $u(m)=1-e^{m/\rho}$ and the probability density p(m) is a normal distribution with mean m0 and standard deviation sigma, expected value=$m_0$ $$\text{Certain Equivalent} = \mu_0 - \frac{\sigma^2}{2\rho}$$

In this very special case, we can solve for rho when certain equivalent=c' to obtain $$\rho = \frac{\sigma^2}{2(\mu_0 - c')}$$

More generally, in the case where the utility function is expressed in terms of n parameters, the visual tool may prompt the user to enter certain equivalents for n different probability distributions $p_1(m)$, $p_2(m)$, ... $p_n(m)$. This would generate n instances of Eq. 1. This set of n equations may be solved for the n parameters of u(m), using numerical methods (and possibly analytic methods for special parameterizations of u(m) and for carefully selected p(m), e.g. Gaussian.

This example allows for two choices regarding how the probability density functions for which the user provides certain equivalent values would be determined. First the user may be prompted to provide any set of n probability distributions and corresponding certain equivalents that they desire. As previously described, each of the n probability distributions may be set by the user using sliders or other input selectors. The tool would record the n probability distribution-certain equivalent pairs, and as described above would use numerical and/or analytic methods to determine the utility function parameters. Second, the tool may determine the n probability distributions, chosen in such a way as to ensure stability of the numerical solution for the utility function parameters. This is mostly likely accomplished by choosing the p(m) to be sufficiently spread out over the space of likely probability densities, and solicit from the user the certain equivalent for each of the n probability distributions.

In a variant of all three examples, the system would replace synthetic probability distribution functions generated by sliders with a selector that would load probability distribution functions computed by another generator (such as a simulation). In this case, the visual tool would simply supply a selector, that would provide a name and possibly other metadata (potentially including a thumbnail view of the function) to guide the user's selection. All other aspects of the process would be as described for the above examples.

Over All Process Flow

Figure 5A:
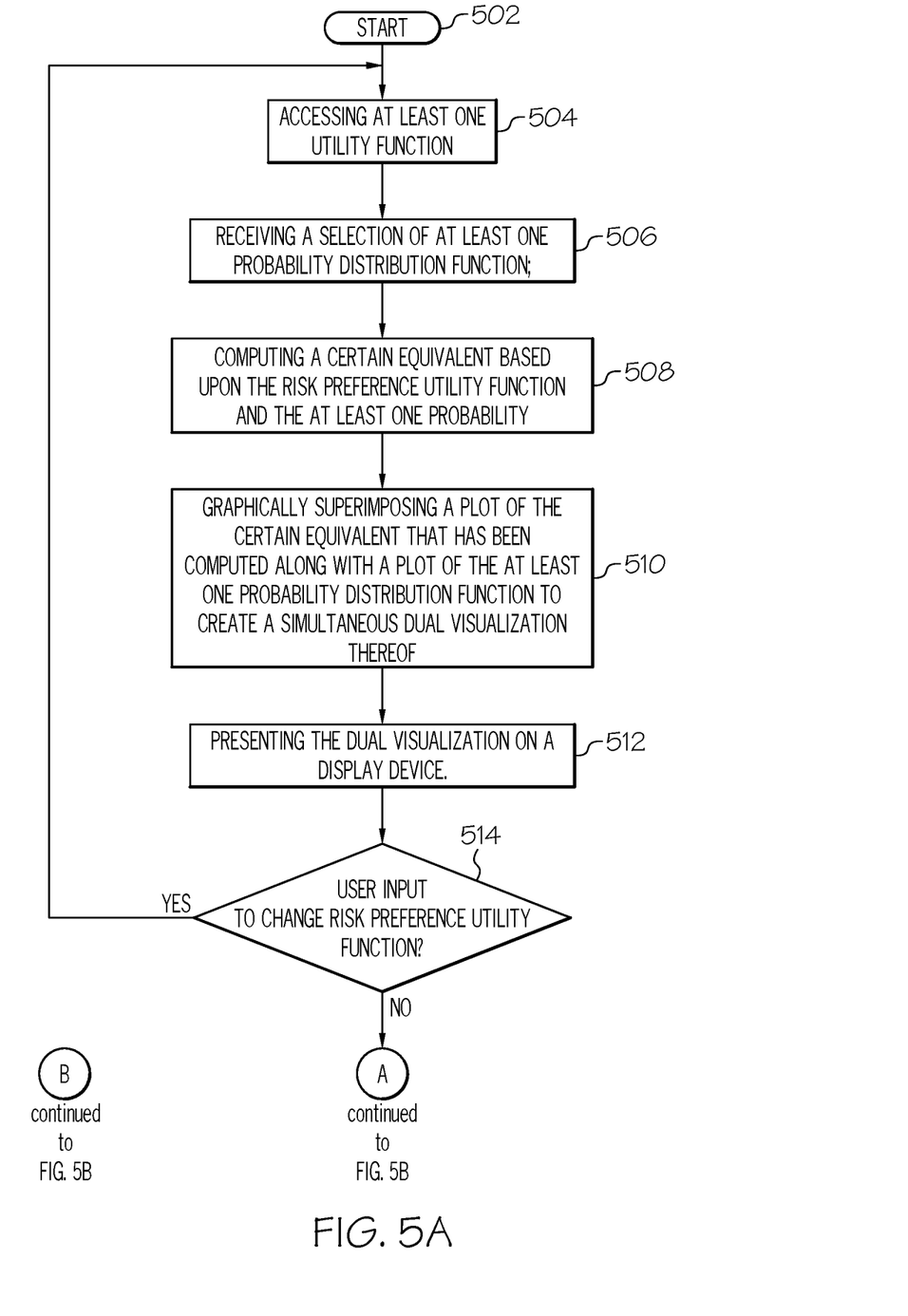
FIGS. 5A and 5B is an example flow diagram of the overall method carried out by the visualization system.
Figure 5B:
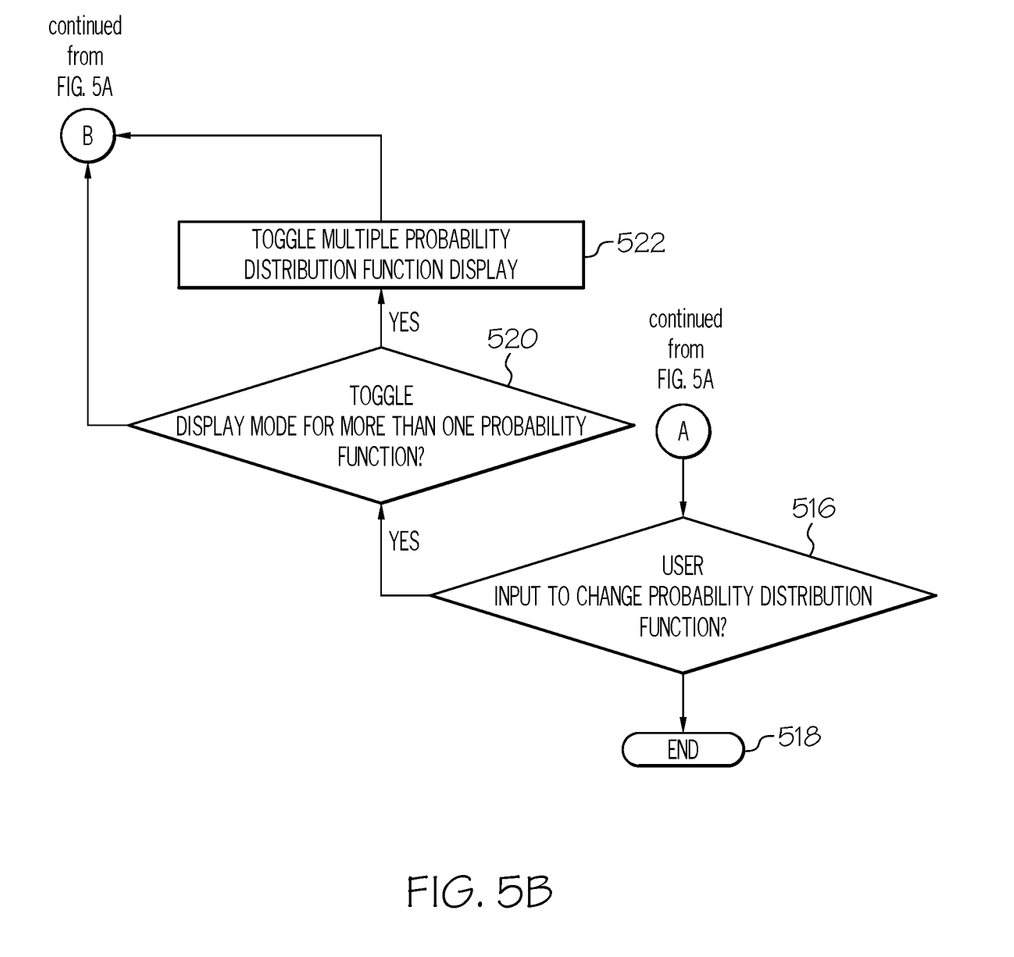

FIGS. 5A and 5B is an example flow diagram of the overall method carried out by the visualization system. The process begins in step 502 and immediately proceeds to step 504 in which at least one utility function is accessed. In one example, a display user-interface component is displayed to allow the user to select one probability distribution function.

In another example, the probability function is automatically retrieved according a configuration file 130 or user profile 120 from a database 140.

In step 506, a probability distribution function is received. In one example, a display user-interface component is displayed to allow the user to select one probability distribution function. In another example, the probability function is automatically retrieved according a configuration file 130 or user profile 120 from a database 140.

Figure 4:
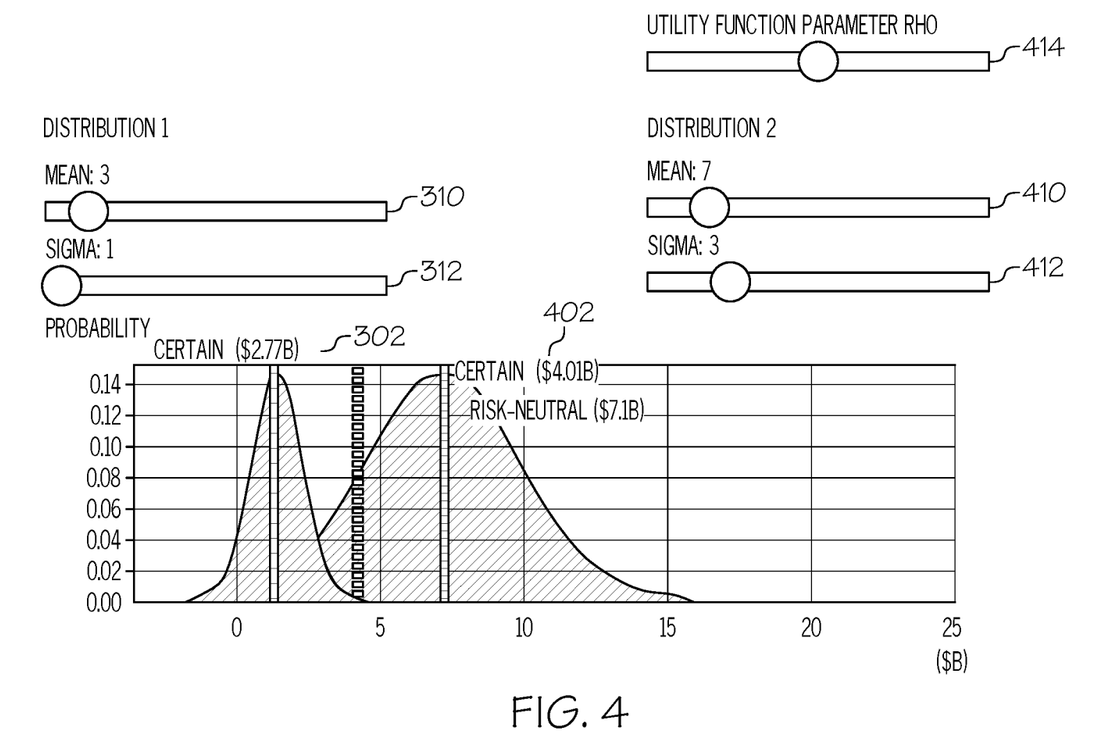
FIG. 4 is example of synthetic probability function of FIG. 3 illustrating a side-by-side comparison for different utility functions.

In step 508, a certain equivalent is computed based upon the risk preference function in step 504 and the probability distribution function in step 506. Next in step 510, the certain equivalent and the probability distribution function are superimposed and presented in step 512 as a composite simultaneously as shown in FIG. 2 through FIG. 4.

A test in step 514 is made to see if any user input is received to change the risk utility preference function and/or any of its parameter. In one example a graphical slider or track bar is used. A slider is a graphical control element with which a user may set a value by moving an indicator, usually in a horizontal fashion. In some cases user may also click on a point on the slider to change the setting. It is different from a scrollbar in that it is not continuous but used to adjust a value without changing the format of the display or the other information on the screen. The number of sliders may be automatically created corresponding to the number of parameters available for the probability function, the utility function or both. In response to detecting user input, the process loops back to step 504 as shown. This may be viewed as user over-ride selection of the certain equivalent computed. Otherwise, the process continues to the next step.

Another test in step 516 is made to see if any user input is received to change the probability distribution function and/or any of its parameter. In response to detecting user input, the process continues to step 520 to determine if more than one probability function display mode should be enabled as shown in FIG. 4 for side-by-side simultaneous comparison. If yes, this mode is enabled in step 522. This may be viewed as user over-ride selection of the certain equivalent computed. Otherwise the process loops back to step 506 as shown. In absence of any further input, the process ends in step 518.

Generalized Computing Environment

Figure 6:
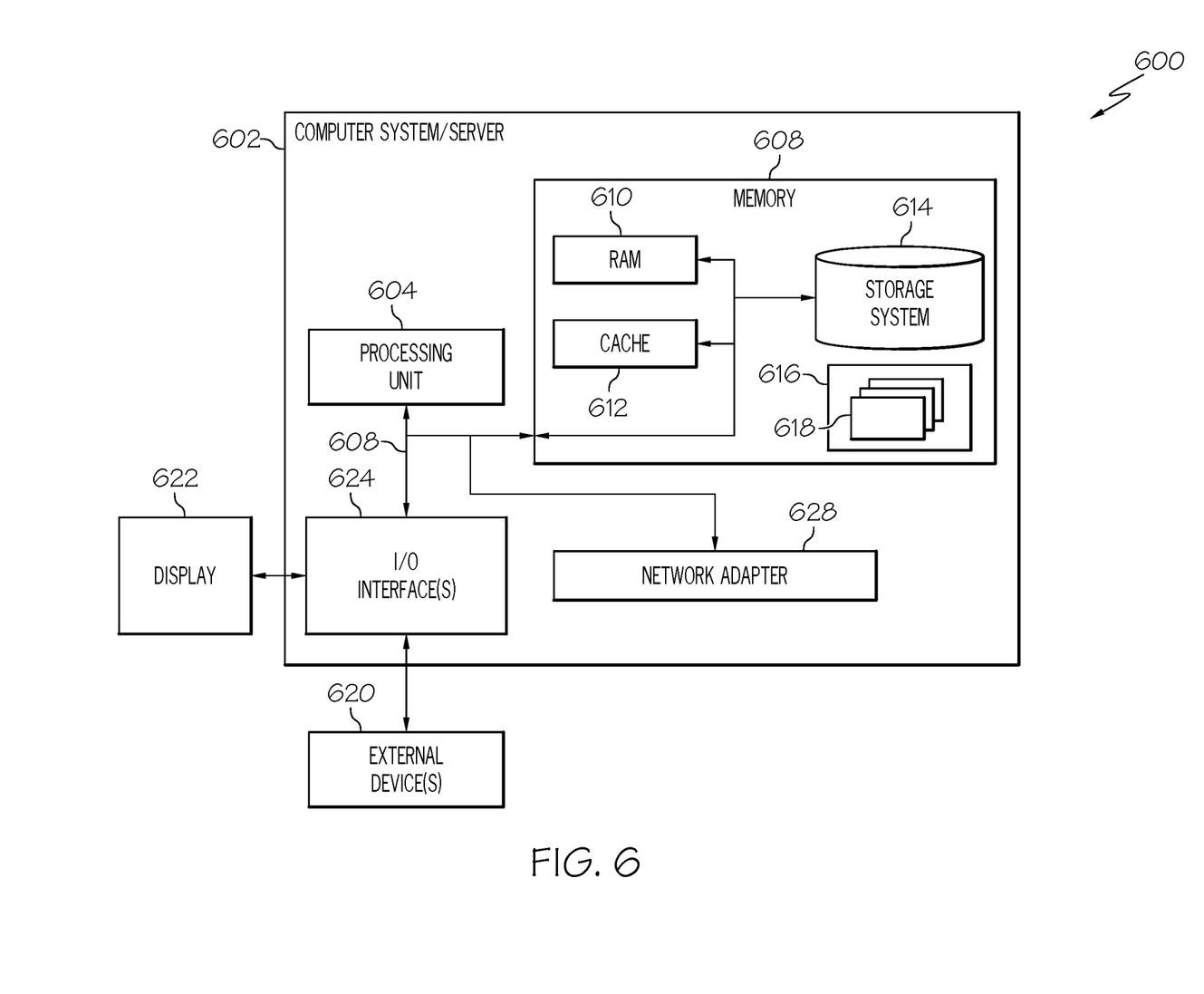
FIG. 6 illustrates one example of a processing node for operating the block diagram of FIG. 1 of a visualization system.

FIG. 6 illustrates one example of a processing node 600 for operating the block diagram of FIG. 1 of a visualization system of examples of the invention described herein. Regardless, the computing node 600 is capable of being implemented and/or performing any of the functionality set forth hereinabove.

In computing node 600 there is a computer system/server 602, which is operational with numerous other general purpose or special purpose computing system environments or configurations. Examples of well-known computing systems, environments, and/or configurations that may be suitable for use with computer system/server 602 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 602 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 602 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 602 in cloud computing node 600 is shown in the form of a general-purpose computing device. The components of computer system/server 602 may include, but are not limited to, one or more processors or processing units 604, a system memory 606, and a bus 608 that couples various system components including system memory 606 to processor 604.

Bus 608 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 602 typically includes a variety of computer system readable media. Such media may be any available media that is accessible by computer system/server 602, and it includes both volatile and non-volatile media, removable and non-removable media.

System memory 606, in one example, implements the box diagram of FIG. 1 and the flow of FIG. 2 The system memory 606 can include computer system readable media in the form of volatile memory, such as random access memory (RAM) 610 and/or cache memory 612. Computer system/server 602 may further include other removable/non-removable, volatile/non-volatile computer system storage media. By way of example only, storage system 614 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 608 by one or more data media interfaces. As will be further depicted and described below, memory 606 may include at least one program product having a set (e.g., at least one) of program modules that are configured to carry out the functions of various examples of the invention.

Program/utility 616, having a set (at least one) of program modules 618, may be stored in memory 606 by way of example, and not limitation, as well as an operating system, one or more application programs, other program modules, and program data. Each of the operating system, one or more application programs, other program modules, and program data or some combination thereof, may include an implementation of a networking environment. Program modules 618 generally carry out the functions and/or methodologies of various examples of the invention as described herein.

Computer system/server 602 may also communicate with one or more external devices 1020 such as a keyboard, a pointing device, a display device 622, etc.; one or more devices that enable a user to interact with computer system/server 602; and/or any devices (e.g., network card, modem, etc.) that enable computer system/server 602 to communicate with one or more other computing devices. Such communication can occur via I/O interfaces 624. Still yet, computer system/server 602 can communicate with one or more networks such as a local area network (LAN), a general wide area network (WAN), and/or a public network (e.g., the Internet) via network adapter 626. As depicted, network adapter 626 communicates with the other components of computer system/server 602 via bus 608. It should be understood that although not shown, other hardware and/or software components may be used in conjunction with computer system/server 602. Examples, include, but are not limited to: microcode, device drivers, redundant processing units, external disk drive arrays, RAID systems, tape drives, and data archival storage systems, etc.

Non-Limiting Examples

The present invention may be a system, a method, and/or a computer program product. The computer program product may include a computer readable storage medium (or media) having computer readable program instructions thereon for causing a processor to carry out aspects of the present invention.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been discussed above with reference to flowchart illustrations and/or block diagrams of methods, apparatus (systems) and computer program products according to various embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The description of the present application has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method for providing a risk preference visualization over a set of alternatives and over which an individual has a preference ordering, the method comprising:
   a) accessing at least one utility function that ranks the set of alternatives according to their utility to an individual;
   b) receiving a selection of at least one probability distribution function from a database of stored probability distribution functions, in which each probability distribution function is a different family of probability distribution functions to define a particular probability distribution;
   c) computing a certain equivalent based upon the utility function and the at least one probability distribution function, wherein the certain equivalent is defined as a risk-free amount of outcome rather than taking a chance on a higher risky amount;
   d) graphically superimposing a plot of the certain equivalent that has been computed along with a plot of the at least one probability distribution function to create a simultaneous dual visualization thereof;
   e) presenting the simultaneous dual visualization on a display device;
   f) receiving another selection to at least one of:
      one or more parameters of the probability distribution function,
      accessing another at least one probability distribution function from the database, and
      an over-ride the certain equivalent computed in response to receiving a selection of the at least one probability distribution function; and
   g) in response to receiving the another selection, repeating steps c through f, otherwise in response to not receiving another selection then ending a processing of the steps c through f.

2. The computer-implemented method of claim 1, further comprising:
   displaying a user-interface component for receiving from a user a selection of the at least one probability distribution function.

3. The computer-implemented method of claim 1, further comprising:
   displaying a user-interface component for receiving from a user a selection for accessing at least one utility function.

4. The method of claim 1, wherein the receiving the selection of at least one parameter of the at least one probability distribution function includes receiving a position on a graphical slider control.

5. The method of claim 4, further comprising:
   determining a number of parameters for the at least one probability distribution function; and
   presenting a separate user-adjustable graphical slider control for each parameter.

6. The method of claim 1, further comprising:
   receiving a selection to over-ride the certain equivalent computed in response to receiving a selection of the probability distribution function; and
   in response to receiving the selection to over-ride, re-computing the utility function and re-computing the certain equivalent.

7. The method of claim 6, further comprising:
   presenting the dual visualization on the display device that has been re-computed along with at least one dual visualization that has been previously created in order to present a plurality of dual visualizations each with a different probability distribution.

8. The method of claim 1, wherein the at least one utility function is an exponential utility function.

9. A system for providing a risk preference visualization over a set of alternatives and over which an individual has a preference ordering, the system comprising:
   a memory;
   a processor communicatively coupled to the memory, where the processor is configured to perform
      a) accessing at least one utility function that ranks the set of alternatives according to their utility to an individual;
      b) receiving a selection of at least one probability distribution function from a database of stored probability distribution functions, in which each probability distribution function is a different family of probability distribution functions to define a particular probability distribution;
      c) computing a certain equivalent based upon the utility function and the at least one probability distribution function, wherein the certain equivalent is defined as a risk-free amount of outcome rather than taking a chance on a higher risky amount;
      d) graphically superimposing a plot of the certain equivalent that has been computed along with a plot of the at least one probability distribution function to create a simultaneous dual visualization thereof;
      e) presenting the simultaneous dual visualization on a display device;
      f) receiving another selection to at least one of:
         one or more parameters of the probability distribution function,
         accessing another at least one probability distribution function from the database, and
         an over-ride the certain equivalent computed in response to receiving a selection of the at least one probability distribution function; and
      g) in response to receiving the another selection, repeating steps c through f, otherwise in response to not receiving another selection then ending a processing of the steps c through f.

10. The system of claim 9, further comprising:
    displaying a user-interface component for receiving from a user a selection of the at least one probability distribution function.

11. The system of claim 9, further comprising:
    displaying a user-interface component for receiving from a user a selection for accessing at least one utility function.

12. The system of claim 9, wherein the receiving the selection of at least one parameter of the at least one probability distribution function includes receiving a position on a graphical slider control.

13. The system of claim 12, further comprising:
    determining a number of parameters for the at least one probability distribution function; and
    presenting a separate user-adjustable graphical slider control for each parameter.

14. The system of claim 9, further comprising:
    receiving a selection to over-ride the certain equivalent computed in response to receiving a selection of the probability distribution function; and
    in response to receiving the selection to over-ride, re-computing the utility function and re-computing the certain equivalent.

15. A non-transitory computer program product for providing a risk preference visualization over a set of alternatives and over which an individual has a preference ordering, the computer program product comprising a computer readable storage medium having computer readable program code embodied therewith, the computer readable program code configured to perform:
- a) accessing at least one utility function that ranks the set of alternatives according to their utility to an individual;
- b) receiving a selection of at least one probability distribution function from a database of stored probability distribution functions, in which each probability distribution function is a different family of probability distribution functions to define a particular probability distribution;
- c) computing a certain equivalent based upon the utility function and the at least one probability distribution function, wherein the certain equivalent is defined as a risk-free amount of outcome rather than taking a chance on a higher risky amount;
- d) graphically superimposing a plot of the certain equivalent that has been computed along with a plot of the at least one probability distribution function to create a simultaneous dual visualization thereof;
- e) presenting the simultaneous dual visualization on a display device;
- f) receiving another selection to at least one of:
  - one or more parameters of the probability distribution function,
  - accessing another at least one probability distribution function from the database, and
  - an over-ride the certain equivalent computed in response to receiving a selection of the at least one probability distribution function; and
- g) in response to receiving the another selection, repeating steps c through f, otherwise in response to not receiving another selection then ending a processing the steps c through f.

16. The non-transitory computer program product of claim 15, further comprising:
displaying a user-interface component for receiving from a user a selection of the at least one probability distribution function.

17. The non-transitory computer program product of claim 15, further comprising:
displaying a user-interface component for receiving from a user a selection for accessing at least one utility function.

* * * * *